United States Patent
Sim et al.

(10) Patent No.: US 10,789,851 B1
(45) Date of Patent: Sep. 29, 2020

(54) SYSTEM AND METHOD FOR VISION SENSOR DETECTION

(71) Applicant: GM GLOBAL TECHNOLOGY OPERATIONS LLC, Detroit, MI (US)

(72) Inventors: Jay H. Sim, Bloomfield, MI (US); Xiaofeng F. Song, Novi, MI (US); Sai Vishnu Aluru, Commerce, MI (US); Valor Yaldo, Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/559,822

(22) Filed: Sep. 4, 2019

(51) Int. Cl.
| | |
|---|---|
| *G06T 15/00* | (2011.01) |
| *G08G 1/16* | (2006.01) |
| *G01S 13/87* | (2006.01) |
| *G01S 13/931* | (2020.01) |

(52) U.S. Cl.
CPC .............. *G08G 1/166* (2013.01); *G01S 13/87* (2013.01); *G08G 1/165* (2013.01); *G01S 2013/9315* (2020.01); *G08G 1/167* (2013.01)

(58) Field of Classification Search
CPC ........ G08G 1/166; G08G 1/165; G08G 1/167; G01S 13/87; G01S 2013/9315
See application file for complete search history.

(56) References Cited

U.S. PATENT DOCUMENTS

| | | | | |
|---|---|---|---|---|
| 6,373,400 | B1* | 4/2002 | Fujita | B60K 35/00 340/901 |
| 6,947,064 | B1* | 9/2005 | Hahn | G08G 1/0962 345/427 |
| 2006/0085125 | A1* | 4/2006 | Shibata | G01C 21/365 701/414 |
| 2009/0112389 | A1* | 4/2009 | Yamamoto | G08G 1/167 701/31.4 |
| 2013/0201335 | A1* | 8/2013 | Heinemann | H04N 5/262 348/148 |
| 2013/0265189 | A1* | 10/2013 | Chang | G01S 13/87 342/52 |
| 2015/0055120 | A1* | 2/2015 | Le | G08G 1/165 356/28 |
| 2015/0329107 | A1* | 11/2015 | Meyer | B60W 30/143 701/28 |
| 2017/0309181 | A1* | 10/2017 | Lee | G01S 13/867 |
| 2018/0048801 | A1* | 2/2018 | Kiser | H04N 5/23238 |
| 2020/0134896 | A1* | 4/2020 | Chang | G06T 11/60 |

* cited by examiner

*Primary Examiner* — Munear T Akki
(74) *Attorney, Agent, or Firm* — Lorenz & Kopf, LLP

(57) ABSTRACT

Vision sensor detection systems and methods for mobile platforms that proactively prepare for impending lighting scenarios. The method includes determining or predicting a lighting scenario (LS) as a function of GPS data and wirelessly received mapping data. An on-board camera system is then operated in the LS using an associated predefined profile (PDP) having a tone-mapping setting associated with the LS. Received sensor data and camera data is used to confirm each predicted and current LS; Each predicted LS change results in retrieval of an associated PDP with its tone-mapping setting. Each confirmed LS results in using the sensor data and camera data to customize the tone-mapping setting. The method cycles during operation of the mobile platform.

20 Claims, 6 Drawing Sheets

SYSTEM AND METHOD FOR VISION SENSOR DETECTION

TECHNICAL FIELD

The present disclosure generally relates to vision sensor detection systems for mobile platforms, and more particularly relates to vision sensor detection systems and methods that proactively prepare for impending lighting scenarios.

Adjusting tone-mapping settings in cameras to detected light levels is a technological problem. Vision sensor detection systems in vehicles often use a Lux meter to detect a light level and then begin a process of adjusting tone-mapping in the camera to match the detected light level. Adjusting tone-mapping settings can take around 36-48 frames out of 30 frames per second (fps) to resolve. Depending on the speed the vehicle is traveling, the adjustment time can translate to several car lengths, during which time the vehicle may be relying on unoptimized camera images.

Accordingly, it is desirable to provide technological solutions to this problem in the form of improved vision sensor detection systems and methods that proactively prepare for impending lighting scenarios and reduce the tone-mapping adjustment time. The following disclosure provides a technological solution to this problem, in addition to addressing related issues. Furthermore, other desirable features and characteristics of the system and method will become apparent from the subsequent detailed description and the appended claims, taken in conjunction with the accompanying drawings and the preceding background.

SUMMARY

In one embodiment, a vision sensor detection system for a mobile platform is provided. The system includes: a transceiver that receives mapping data from an external source; a camera system that senses light levels external to the mobile platform as a function of adjustable tone-mapping settings; a sensor system that generates sensor data including distances to objects; a geographical positioning system (GPS) that generates GPS data including location and movement of the mobile platform; a processor programmed with a tone-mapping program and a plurality of predefined profiles (PDPs) for an associated plurality of lighting scenarios (LSs), each PDP having a tone-mapping setting for the camera system, the processor configured to: receive the mapping data, GPS data, the sensor data, and the camera data; operate the camera system in a first lighting scenario (LS1) using an associated first PDP (PDP1); display camera data on a display system; predict a lighting scenario (LS) change as a function of GPS data and mapping data, wherein the LS change comprises a change from LS1 to a second lighting scenario (LS2); confirm the LS change using the camera data and the sensor data; retrieve a PDP2 associated with LS2; and operate the camera system using PDP2.

In an embodiment, the processor is further configured to: determine whether the LS2 is still current; and when the LS2 is still current, process the sensor data and the camera data to thereby customize the tone-mapping setting from PDP2; and operate the camera system using the customized tone-mapping setting.

In an embodiment, the processor is further configured to: when the LS2 is no longer current, predict an impending light scenario as a function of the mapping data, the sensor data, and the camera data; retrieve a PDP associated with the impending light scenario; and operate the camera system using the PDP associated with the impending light scenario.

In an embodiment, the impending light scenario is the same as LS1, and the PDP associated with the impending light scenario is PDP1.

In an embodiment, the impending light scenario is a third lighting scenario (LS3), and the PDP associated with the impending light scenario is PDP3.

In an embodiment, the LS1 is a sunny daytime, and LS2 is a tunnel.

In an embodiment, the LS1 is a sunny daytime, and LS2 is a commercial parking garage.

In an embodiment, the LS1 is a sunny daytime, and LS2 is an entrance to an airport terminal.

In an embodiment, the LS1 is a commercial parking garage, and LS2 is a sunny daytime.

In an embodiment, the LS1 is a commercial parking garage, and LS2 is nighttime.

In another embodiment, a processor-implemented method for vision sensor detection for a mobile platform is provided, including: receiving mapping data from an external source; receiving camera data from a camera system that senses light levels external to the mobile platform as a function of adjustable tone-mapping settings; receiving sensor data from a sensor system; receiving geographical positioning system (GPS) data including location and movement of the mobile platform from a GPS; determining a lighting scenario (LS1) as a function of GPS data and mapping data; operating the camera system in LS1 using an associated first PDP (PDP1), by referencing a plurality of predefined profiles (PDPs) for an associated plurality of lighting scenarios (LSs), each PDP having a tone-mapping setting associated with its associated LS; displaying the camera data on a display system; predicting a lighting scenario (LS) change as a function of GPS data and mapping data, wherein the LS change comprises a change from LS1 to a second lighting scenario (LS2); confirming the LS change using the camera data and the sensor data; retrieving a PDP2 associated with LS2; and operating the camera system using PDP2.

In an embodiment, further including: determining whether the LS2 is still current; and when the LS2 is still current, processing the sensor data and the camera data to thereby customize the tone-mapping setting from PDP2; and operating the camera system using the customized tone-mapping setting.

In an embodiment, further including: when the LS2 is no longer current, predicting an impending light scenario as a function of the mapping data, the sensor data, and the camera data; retrieving a PDP associated with the impending light scenario; and operating the camera system using the PDP associated with the impending light scenario.

In an embodiment, the impending light scenario is the same as LS1, and the PDP associated with the impending light scenario is PDP1.

In an embodiment, the impending light scenario is a third lighting scenario (LS3), and the PDP associated with the impending light scenario is PDP3.

In an embodiment, the LS1 is a sunny daytime, and LS2 is a tunnel.

In an embodiment, the LS1 is a sunny daytime, and LS2 is a commercial parking garage.

In an embodiment, the LS1 is a sunny daytime, and LS2 is an entrance to an airport terminal.

In an embodiment, the LS1 is a commercial parking garage, and LS2 is a sunny daytime or nighttime.

In another embodiment, a vision sensor detection system for a mobile platform is provided, including: a camera system that senses light levels external to the mobile platform as a function of adjustable tone-mapping settings; a sensor system that generates sensor data including distances to objects; a processor programmed with a tone-mapping program and a plurality of predefined profiles (PDPs) for an associated plurality of lighting scenarios (LSs), each PDP having a tone-mapping setting for the camera system, the processor configured to: receive mapping data, GPS data, the sensor data, and the camera data; operate the camera system in a first lighting scenario (LS1) using tone-mapping settings from an associated first PDP (PDP1); display camera data on a display system; predict a lighting scenario (LS) change as a function of GPS data and mapping data, wherein the LS change comprises a change from LS1 to a second lighting scenario (LS2); confirm the LS change using the camera data and the sensor data; retrieve a PDP2 associated with LS2; and operate the camera system using tone-mapping settings in the PDP2.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
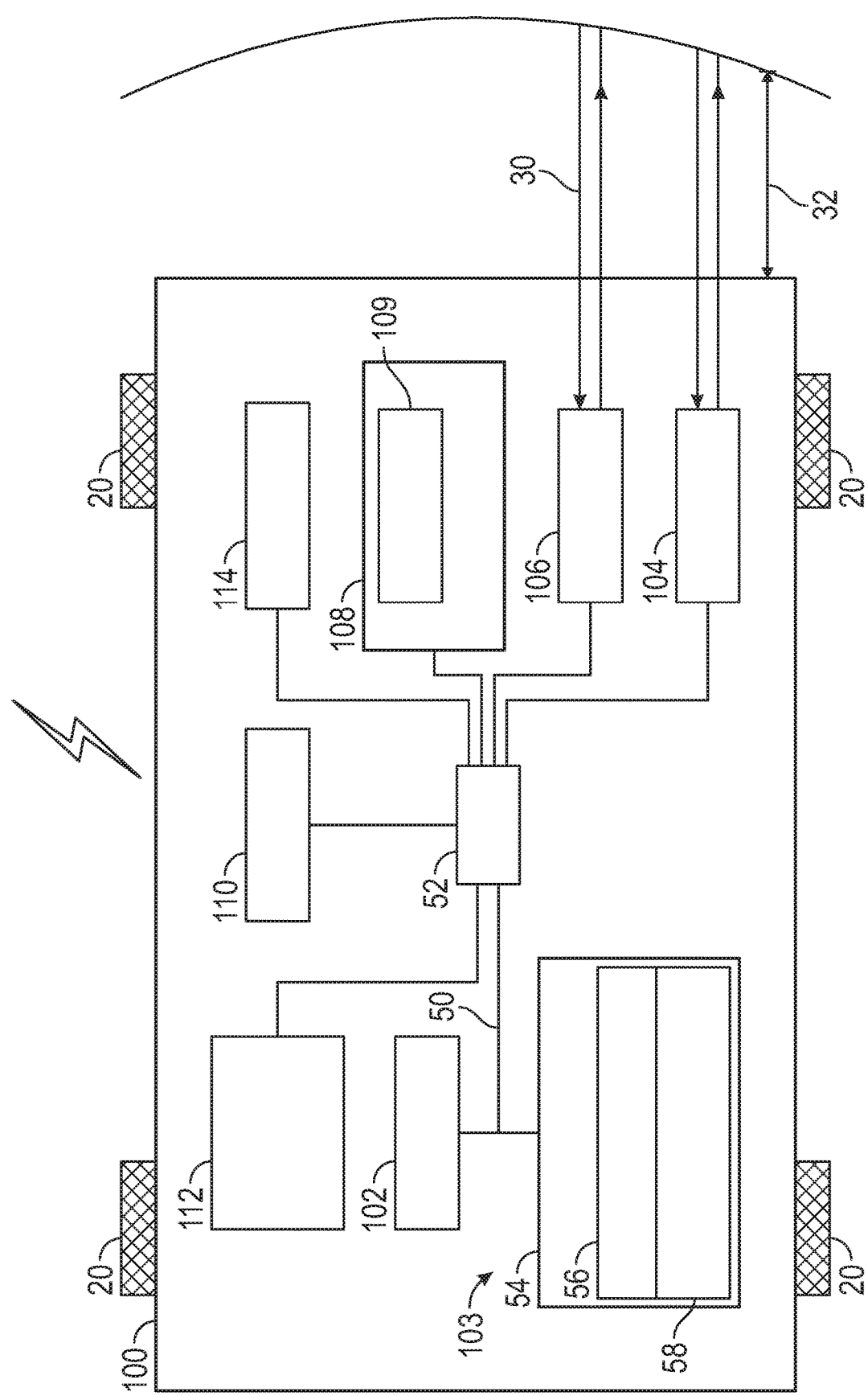
FIG. 1 is a schematic diagram illustrating a vehicle that includes a vision sensor detection system, in accordance with various embodiments.

The following detailed description is merely exemplary in nature and is not intended to limit the application and uses. Furthermore, there is no intention to be bound by any expressed or implied theory presented in the preceding technical field, background, summary, or the following detailed description.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices.

As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the functionality attributed to the module. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As mentioned, vision sensor detection systems in vehicles often use a Lux meter to detect light levels in a camera system, and then begin a process of adjusting tone-mapping in the camera to the detected light level. Adjusting tone-mapping can take around 36-48 frames to resolve, which can translate into several car lengths. This amount of time and distance can raise safety concerns for autonomous vehicles, presenting a technological problem to solve. The herein described vision sensor detection systems and methods for mobile platforms provide a solution by proactively preparing for impending lighting scenarios. The method includes determining or predicting a lighting scenario (LS) as a function of GPS data and wirelessly received mapping data; this can be done quickly and prior to the vehicle reaching the change in lighting scenario (e.g., before the vehicle gets to a tunnel). An on-board camera system is then operated in the LS a tone-mapping setting associated with the LS, that is retrieved from a predefined profile (PDP) that is associated with the LS. Received sensor data and camera data is used to confirm each predicted and current LS; Each predicted LS change results in retrieval of an associated PDP with its tone-mapping setting. Each confirmed LS results in using the sensor data and camera data to customize the tone-mapping setting. The method cycles during operation of the mobile platform. The system and method are described in more detail in connection with the figures below.

FIG. 1 depicts an example mobile platform. The example mobile platform is a vehicle 100 that is capable of movement and carrying passengers from one location to another. The vehicle 100 is depicted in the illustrated embodiment as a passenger car, but other vehicle types, including motorcycles, taxi cabs, vehicle fleets, buses, sedans, wagons, trucks, sport utility vehicles, other automobiles, recreational vehicles (RVs), locomotives, and other vehicles may also be used. As is generally understood, the vehicle 100 may embody a body, chassis, and wheels, each of which are rotationally coupled to the chassis near a respective corner of the body. The vehicle 100 is depicted with four wheels 20, but the number of wheels 20 may vary in other embodiments. The vehicle 100 may be autonomous or semi-autonomous.

The example vehicle 100 includes a number of communicatively coupled components. Non-limiting examples of the communicatively coupled components include a sensor system 104, a camera 106 system, a display system 108, a transceiver 110, a geographic positioning system (GPS) 112, a vision detection processor 102, and a storage device, storage 54. The processor and storage 54 may communicate with other components onboard the vehicle 100, via a bus 50, and a communication fabric, referred to as an input/output or 52. The vehicle 100 is also understood to include a collective functional block, drive systems 114, which generally includes known vehicle systems for vehicle operation, such as, a propulsion system, a transmission system, a steering system, actuators for the wheels, and a brake system, and generates a variety of signals, including vehicle speed and vehicle acceleration. The drive systems 114 and other on-board systems provide signals to the processor 102 from which the processor 102 generates, as outputs, controls for the camera 106 system and for the display system 108. In various embodiments, on-board systems, such as the drive systems 114, utilize various processor 102 outputs, such as displayed images 109 on the display system 108, to control various aspects of vehicle 100 operation for example, by controlling traction devices associated with the wheels and brakes.

The vehicle 100 includes a vision detection system, shown generally as system 103. A technological improvement delivered by the system 103 is a rapid adjustment to lighting scenario (LS) changes. The rapid adjustment to LS changes is enabled, at least in part, by LS-specific tone-mapping settings that are predefined and available for quick retrieval based on the LS (provided in a predefined profile (PDP) associated with the LS). The processor 102 commands the camera 106 system to adjust its tone-mapping settings; consequently, the system 103 rapidly delivers images and video on the display system 108 that provide detail of objects therein.

The phrase "lighting scenario" (LS) is used herein as a way of categorizing a variety of predefined environmental or obstacle-related occurrences that can represent a large swing in the light level detected by the camera 106 system in a short amount of time. Broadly speaking, examples include overhangs, whiteouts and blackouts. As used herein, a blackout is an occurrence defined as: when camera senses a light level of more than 60% of white light in a scene, and then, in less than 1 second, the camera senses a scene change to more than 60% of the scene being black (the absence of light). A blackout has a corresponding period of time in which the image generated by the camera 106 system has all the pixels in the image appearing black (the absence of light), preventing objects from being detected. Depending on the speed of the vehicle at the time of a blackout, the blackout period could last for 36-48 camera frames. As used herein, a whiteout is an occurrence defined as: when camera senses a light level of more than 60% black (absence of light) in a scene, and then, in less than 1 second, the camera senses a scene change to a light level of more than 60% of the scene being white light. A whiteout has a corresponding period of time in which the image generated by the camera 106 system has all the pixels in the image appearing white, preventing objects from being detected. Depending on the speed of the vehicle at the time of a whiteout, the whiteout period could last for 36-48 camera frames.

In practice, exemplary LSs can include whiteout and blackout situations, and can include covered bridges, tunnels, residential parking garages, commercial parking garages, covered airport terminals, and the like. Some examples of LSs are developed in more detail below, in connection with the Table 1 discussion. FIGS. 4-7 provide examples showing the technological improvements in some common LSs, as provided by the system 103.

Returning to the FIG. 1, the functions and operations of each of these components are described in more detail below.

The sensor system 104 includes one or more sensing devices that sense observable conditions of the exterior environment (such as surface condition, precipitation, light level, distance to objects, and the like) and generate sensor data relating thereto. The sensing devices might include, but are not limited to: radars (e.g., long-range, medium-range-short range), lidars, ultrasonic sensors, odometry sensors (e.g., encoders) and/or other sensors that might be utilized in connection with systems and methods in accordance with the present subject matter. Non-limiting examples of characteristics that may be embodied in the sensor system data include a distance to an object 32, an amount of precipitation, unevenness of the surface, presence of ice, presence of water, etc.

The camera 106 system may include one or more optical cameras (e.g., forward facing, 360-degree, rear-facing, side-facing, stereo, etc.), thermal (e.g., infrared) cameras, and the like. The camera 106 system senses light levels 30, edges, contrast, saturation of light, etc., as a function of adjustable tone-mapping settings, and generates camera data based thereon. Non-limiting examples of characteristics that may be embodied in the camera system data include panoramic view, amount of light, edges, contrast, saturation, etc. The camera 106 system is controlled by the processor 102, and specifically responds to tone-mapping settings provided by the processor 102.

Display system 108 is configured to continuously receive and process display commands from the processor 102, and to display camera 106 system data, in the form of images and videos. The display system 108 includes a display device for presenting a displayed image 109. In various embodiments described herein, the display system 108 includes a synthetic vision system (SVS), and displayed image 109 is a SVS image. In exemplary embodiments, the display device is realized on one or more electronic display devices.

Transceiver 110 includes the hardware and software to support one or more communication protocols for wireless communication between the processor 102 and external sources, such as satellites, the cloud, communication towers and ground stations. In various embodiments, the transceiver 110 is configured to receive mapping data. In various embodiments, the transceiver 110 is configured to receive up-to-date high definition (HD) mapping data pursuant to a valid subscription and used by the GPS 112 and the processor 102. HD mapping data generally includes road geometries, road curvatures, slopes, angles, widths, speed limits, numbers and assignments of lanes (e.g., passing lanes, exit lanes, etc.), locations of tunnels, locations of covered bridges, locations of commercial parking garages, and the like.

The global positioning system (GPS) 112 performs the functions of subscribing to external mapping providers, for example, to obtain the up-to-date high definition (HD) mapping data. The GPS 112 also generates GPS data for the vehicle 100, including the location and movement of the vehicle 100. By comparing GPS data to HD mapping data, the processor 102 makes predictions about upcoming lighting scenario (LS) changes. Although FIG. 1 depicts the vehicle 100 as having one direction, in various embodiments, the vehicle 100 can move in any direction, i.e., 360 degrees. Likewise, in various embodiments, the camera 106 system and the sensor system 104 also can obtain and process information in 360 degrees.

As used herein, the processor 102 facilitates communications and/or interaction between the components of the system 103 and performs additional processes, tasks and/or functions to support operations attributed to the system 103, as described herein. Depending on the embodiment, the processor 102 may be implemented or realized with a general purpose processor (shared, dedicated, or group) controller, microprocessor, or microcontroller, and memory that executes one or more software or firmware programs; a content addressable memory; a digital signal processor; an application specific integrated circuit (ASIC), a field programmable gate array (FPGA); any suitable programmable logic device; combinational logic circuit including discrete gates or transistor logic; discrete hardware components and memory devices; and/or any combination thereof, designed to perform the functions described herein.

In various embodiments, the system 103 is realized as an enhanced computer system, comprising computer readable storage device or media, storage 54, for storage of instructions, algorithms, and/or programs, such as tone-mapping program 56 and a plurality of predefined profiles 58, the processor 102 to execute the program 56, and input/output interface (I/O) 52. The computer readable storage device or media, storage 54, may include volatile and nonvolatile storage in read-only memory (ROM), random-access memory (RAM), and keep-alive memory (KAM), for example. KAM is a persistent or non-volatile memory that may be used to store various operating variables while the processor 102 is powered down. The storage 54 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the processor 102 in controlling the vehicle 100. In various embodiments, processor 102 is configured to implement the system 103.

The processor 102 may employ storage 54, to store and maintain, for each predefined lighting scenario (LS) of a plurality of predefined lighting scenarios (LSs): an associated predefined profile (PDP) for camera 106 operation that includes a tone-mapping setting. For example, for N identified lighting scenarios, there are N respective PDPs. Each of the N PDPs include control information for the camera 106 system, and specifically include tone-mapping settings for the camera 106, to adjust to the identified lighting scenario.

In an exemplary embodiment, the plurality of PDPs may be stored as a lookup table in storage 54, each PDP being associated with one of a respective plurality of LSs, each PDP having at least a tone-mapping setting for operating the camera 106 system in the associated LS. In an exemplary embodiment, daytime and nighttime may be defined by time of day in the geographic location that the mobile platform is operating (e.g., daytime may be from dawn to dusk and nighttime may be from dusk to dawn, wherein one of several available definitions for dawn and dusk are arbitrarily assigned). In an exemplary embodiment, daytime and nighttime may be defined with an arbitrary binary boundary of sunlight intensity, i.e., above a level is daytime, below the level is nighttime. In an exemplary embodiment, "sunny" and "hazy" can have definitions based on a measurement of sunlight intensity, such as using a solar radiometer. In an embodiment, "rainy daytime" can be defined by an amount of sunlight intensity and an amount of precipitation and/or fog. In an embodiment, the lighting scenario of a tunnel or garage, etc., may be arbitrarily defined based on available measurable light, including wavelengths of light that are present or absent. In an embodiment, the lighting scenario of a covered stadium/large indoor dome, for example, the size to enclose a football field and audience, may be arbitrarily defined based on available measurable light, including wavelengths of light that are present or absent. In an exemplary embodiment, upon defining a plurality of lighting scenarios, their tone mapping requirements, and their dimensions (if applicable, such as for structures), the lookup table may be organized as shown in Table 1, below:

TABLE 1

| Entry # | LS | PDP |
|---|---|---|
| 1 | Sunny daytime | Tone mapping for Sunny daytime |
| 2 | Hazy daytime | Tone mapping for Hazy daytime |
| 3 | Rainy daytime | Tone mapping for Rainy daytime |
| 4 | Nighttime | Tone mapping for Nighttime |
| 5 | Commercial parking garage | Tone mapping for Commercial parking garage |
| 6 | Residential parking garage | Tone mapping for Residential parking garage |
| 7 | Tunnel | Tone mapping for Tunnel |
| 8 | Covered Airport terminal | Tone mapping for Covered Airport terminal |
| 9 | Covered stadium/large indoor dome | Tone mapping for Covered stadium/large indoor dome |

Information in the storage 54 may be organized and/or imported from an external source during an initialization or installment operation in a method; it may also be programmed via a user input device. The input/output interface (I/O) 52 may be operationally coupled to the processor 102 via a bus 50 and enables intra-system 103 communication. The input/output interface (I/O) 52 may include one or more wired and/or wireless network interfaces and can be implemented using any suitable method and apparatus. In various embodiments, the input/output interface (I/O) 52 supports communication with technicians, and/or one or more storage interfaces for direct connection to storage apparatuses.

Figure 2:
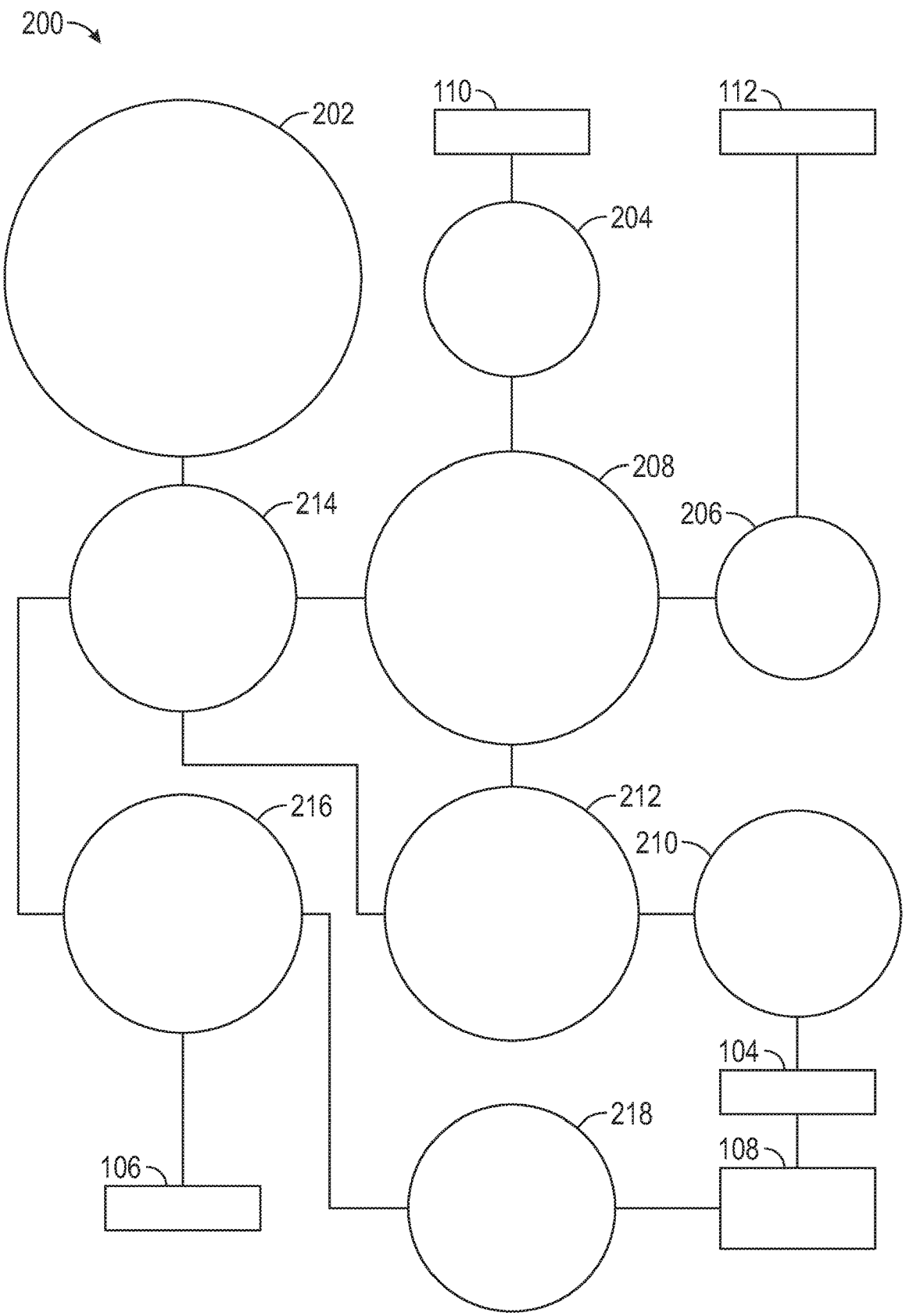
FIG. 2 is a data flow diagram for a vision sensor detection system, in accordance with an exemplary embodiment.

In embodiments as shown in FIG. 2, during operation of the system 103, the processor 102 loads and executes one or more algorithms, instructions, and rules embodied as program 56, and, as such, controls the general operation of the system 103.

The processor 102 is programmed to receive the sensor data from the sensor system 104, camera data from the camera 106 system, and HD mapping data from the transceiver 110. The processor 102 is programmed to generate controls for the camera 106 system, including tone-mapping settings, as a function of the sensor data from the sensor system 104, camera data from the camera 106 system, and HD mapping data from the transceiver 110, as described below. Depending on the embodiment of the system 103, it may perform operations in accordance with an algorithm for tone-mapping, perform operations in accordance with state machine logic, perform operations in accordance with logic in a programmable logic array, or the like.

While the exemplary embodiment of the system 103 in FIG. 1 is described in the context of a fully functioning enhanced computer system, those skilled in the art will recognize that the mechanisms of the present disclosure are capable of being distributed as a program product including program 56 and the predefined profiles 58. Such a program product may comprise an arrangement of instructions organized as multiple interdependent program code modules, each to achieve a separate process, arranged to manage data flow through the system 103 (see, FIG. 2). The program code modules may each comprise an ordered listing of executable instructions for implementing logical functions for the processes performed by the system 103. The instructions, when executed by a processor, cause the processor to receive and process signals, and perform logic, calculations, methods and/or algorithms as described herein for automatically and in real-time generating tone-mapping settings and camera controls for the camera 106 system.

Once developed, the program code modules constituting program product may be stored and distributed individually, or together, using one or more types of non-transitory computer-readable signal bearing media may be used to store and distribute the instructions, such as a non-transitory computer readable medium. Such a program product may take a variety of forms, and the present disclosure applies equally regardless of the type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized as memory and as program product time-based viewing of clearance requests in certain embodiments.

Turning now to FIG. 2 a data flow diagram 200 illustrates an exemplary arrangement for the processes embodied by program 56 and performed by the system 103. Process 202 directs the loading and updating of a plurality (N) of predefined lighting scenarios (LS). Each LS of the plurality of LSs has an associated predefined profile (PDP) that includes tone-mapping settings for the respective LS. Accordingly, there are N respective PDPs.

Process 204 receives HD mapping data from the transceiver 110, and process 206 receives GPS data from the GPS 112. Process 208 predicts a change to a current lighting scenario as a function of the HD mapping data and the GPS data. In an example, the current lighting scenario is unobstructed sunny daylight, and processed HD mapping data and GPS data indicate that there is a tunnel ahead: the current lighting scenario may be considered LS1, and the tunnel lighting scenario may be considered LS2, and the predicted LS change is from LS1 to LS2. In various embodiments, the predicted LS change has a corresponding time, e.g., in 2 minutes. In various embodiments, the predicted LS change has a corresponding distance, e.g., in 3 miles. In various embodiments, the predicted LS change has a corresponding time, and a corresponding distance.

In process 210, sensor data is received from the sensory system and camera data is received from the camera 106 system. In process 212, camera data and sensor data are used to confirm (or discard) the predicted LS change from process 208. For example, at process 208, it was predicted that a tunnel is 3 miles ahead, including geometry and position of the tunnel. At process 212, if sensor data embodies detected structures that are consistent with the predicted tunnel and/or camera data embodies detected light and edge changes that are consistent with a tunnel, the LS change (from open road to tunnel) is confirmed. Likewise, the reverse: returning to the example, at process 208, it was predicted that a tunnel is 3 miles ahead; if, at process 212, sensor data does not embody detected structures that are consistent with the predicted tunnel and/or camera data does not embody detected light and edge changes that are consistent with a tunnel, the LS change is discarded. This scenario might indicate that there was/is a tunnel as indicated in the HD mapping data, but road work or other re-routing is currently bypassing the tunnel.

At process 214, a confirmed LS is used to retrieve the associated PDP, and at process 216, the camera 106 system is operated in accordance with commands from the processor 102, and specifically, is adjusted to the tone-mapping setting of the PDP retrieved in process 214. At process 218, camera data is displayed as images or video 109 on the display system 108.

Each of the processes 202-218 may be performed by the system 103, in accordance with steps of a method, described in more detail below.

Figure 3:
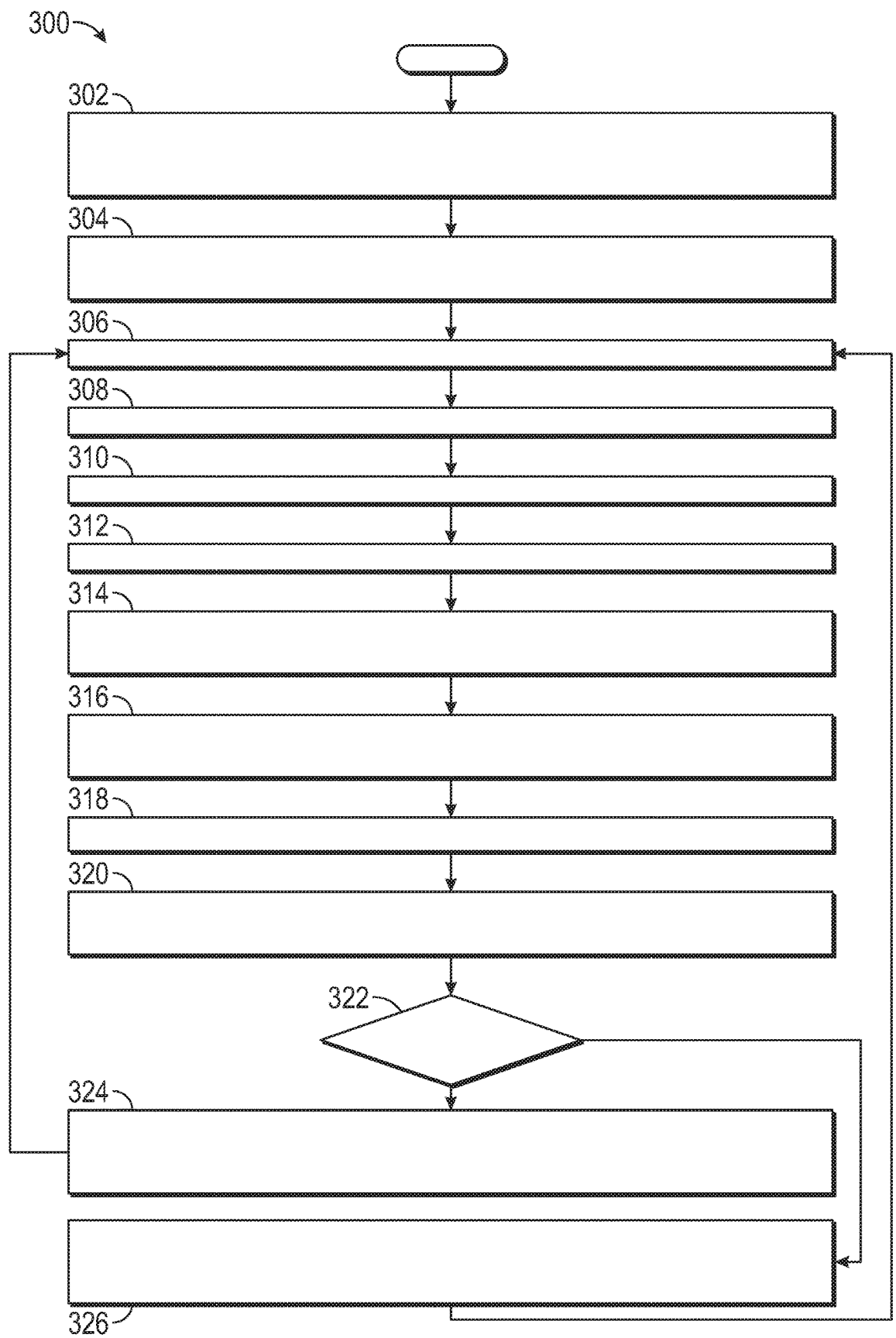
FIG. 3 is a process flow chart depicting an example method for vision sensor detection in a vehicle, in accordance with various embodiments.

Turning now to FIG. 3, the system 103 described above may be implemented by a processor-executable method for vision sensor detection, shown generally as method 300. For illustrative purposes, the following description of method 300 may refer to elements mentioned above in connection with FIGS. 1-2. In practice, portions of method 300 may be performed by different components of the described system 103. It should be appreciated that method 300 may include any number of additional or alternative operations and tasks, the tasks shown in FIG. 3 need not be performed in the illustrated order, and method 300 may be incorporated into a more comprehensive procedure or method having additional functionality not described in detail herein. Moreover, one or more of the tasks shown in FIG. 3 could be omitted from an embodiment of the method 300 as long as the intended overall functionality remains intact.

At 302, the system 103 is initialized. When implemented as an enhanced computer system (e.g., FIG. 1), initialization may comprise uploading, installing, or updating the instructions constituting the program 56 and the plurality of predefined profiles (PDPs) 58 for execution by the processor 102.

At operation 304, at least the mapping data and GPS data are processed to determine an initial lighting scenario (LS), and the camera 106 system is operated in the initial lighting scenario (LS) with an initial tone-mapping setting. In various embodiments, the initial LS may be referred to as LS1, and the initial tone-mapping setting is defined in an associated PDP1. To operate the camera 106 system, a tone-mapping setting for the camera 106 system is first determined by referencing the plurality of predefined profiles (PDPs) for the associated plurality of lighting scenarios (LSs), each PDP having a tone-mapping setting associated with its associated LS, as described above.

At 306, HD mapping data is received from the transceiver 110. At 308, GPS data is received from the GPS 112. At 310 sensor data is received from the sensor system 104 and camera data is received from the camera 106 system. At 312, camera data is displayed as images or video 109 on the display system 108. Images or video are updated at a frame rate.

At 314, a LS change is predicted. The LS change prediction is a function of the HD mapping data and the GPS data. The LS change may be described, in an example, as a change from LS1 to LS2. At 316, the processor 102 processes the camera data and the sensor data with the predicted LS change to confirm or discard the predicted LS change. At 318, when the LS change is confirmed, the processor 102 retrieves a PDP2 that is associated with the LS2. At 320, the processor 102 operates the camera in LS2, using the associated tone-mapping setting defined the PDP2.

With reference back to Table 1, as may be appreciated, in the provided examples, a first lighting scenario may be labeled LS1, to distinguish it from a second lighting scenario LS2, or a third LS, LS3. However, as may be appreciated, LS1 may not mean entry 1 and LS2 may not be entry 2 of Table 1. Without limitation, examples may include: wherein the LS1 is a sunny cloudless daytime, and LS2 is a tunnel; wherein the LS1 is a sunny cloudless daytime, and LS2 is a commercial parking garage; wherein the LS1 is a sunny cloudless daytime, and LS2 is an entrance to an airport terminal; wherein the LS1 is a commercial parking garage, and LS2 is a sunny cloudless daytime; and, wherein the LS1 is a commercial parking garage, and LS2 is nighttime. Moreover, each time there is a current LS, a predicted next LS can be referred to as a predicted impending light scenario. In various embodiments, the predicted impending light scenario is a function of the mapping data; e.g., the tunnel is about to end, according to the map. In other embodiments, the predicted impending light scenario is a function of the sensor data and/or the camera data; e.g., detected variations in light levels indicate that the end of the tunnel is near. In still other embodiments, the predicted impending light scenario is a function of the mapping data and/or the sensor data and/or the camera data. Regardless, responsive to an impending LS, the processor will retrieve a PDP associated with the impending light scenario; and operate the camera 106 system using the PDP associated with the impending light scenario.

At 322, after updating the LS from LS1 to LS2, the processor checks whether LS2 still current. This check is performed as a function of the camera data and the sensor data, it is a validity check that LS2 conditions are still being detected. Referring to the earlier example, this operation is asking whether the vehicle is still in the tunnel.

At operation 324, if LS2 is still current, the sensor data and camera data are processed to customize the tone-mapping setting, and the camera 106 system is operated with the customized tone-mapping setting.

Returning to the example, this may mean that the predefined profile PDP2 for the tunnel has a tone-mapping setting, but once inside the tunnel, data from the sensor system and camera system indicate, for any of a variety of environmental reasons, that a different tone-mapping setting may be optimal, and the processor 102 tunes the PDP2 tone-mapping setting, thereby customizing it to the current tunnel situation. After operation 324, the process may return to operation 306 or end.

In summary, the provided system 103 and method 300 provide tone-mapping adjustments based on both mapping data and tone-mapping adjustments (i.e., customized tone-mapping settings); this strategy delivers optimal detection and fast adjustment to the lighting scenarios, as well as continuous adjustment to the lighting scenarios with the customized tone-mapping settings.

At operation 326, if LS2 is no longer current, the HD mapping data, sensor data, and camera data are processed to identify a relevant lighting scenario (LS3, for example). The processor 102 retrieves PDP3 and operates the camera 106 system in accordance with the tone-mapping established in PDP3. Returning to the example, this may mean that the vehicle has exited the tunnel, in which case, PDP1 may again be current, or a third lighting scenario, PDP3, may be current. After operation 326, the process may return to operation 306 or end.

Figure 4:
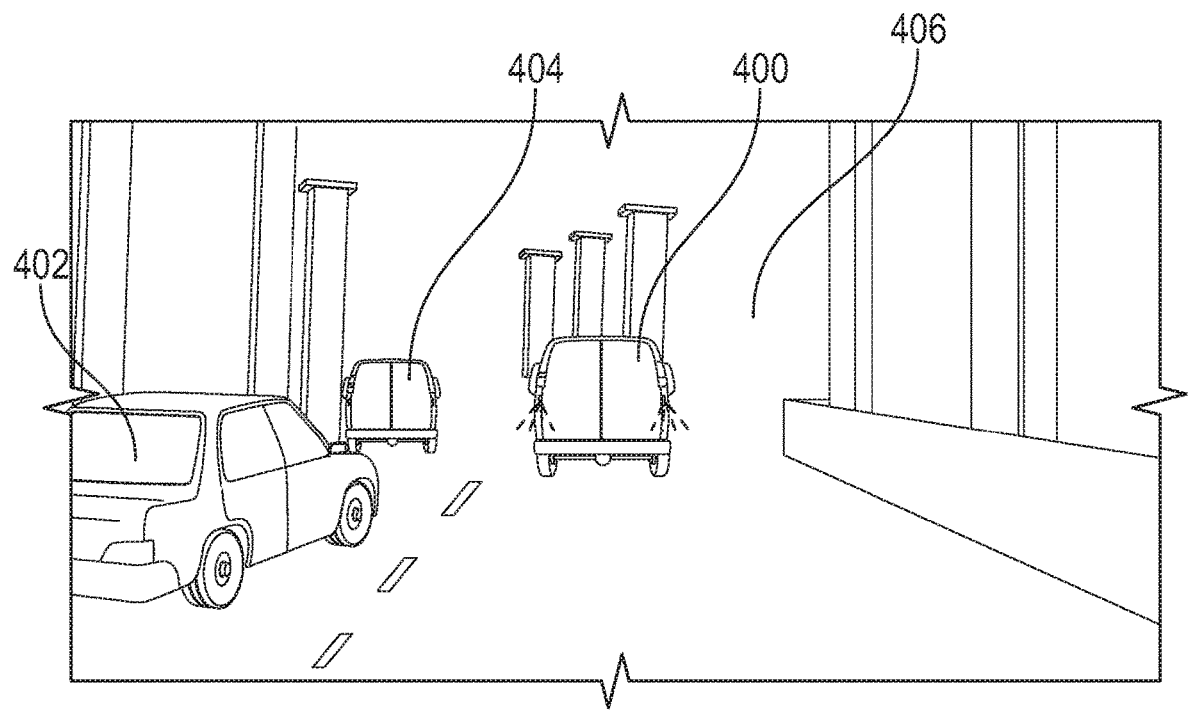
FIGS. 4-7 are exemplary use cases showing display images without the vision sensor detection system and with the vision sensor detection system, in accordance with exemplary embodiments.
Figure 5:
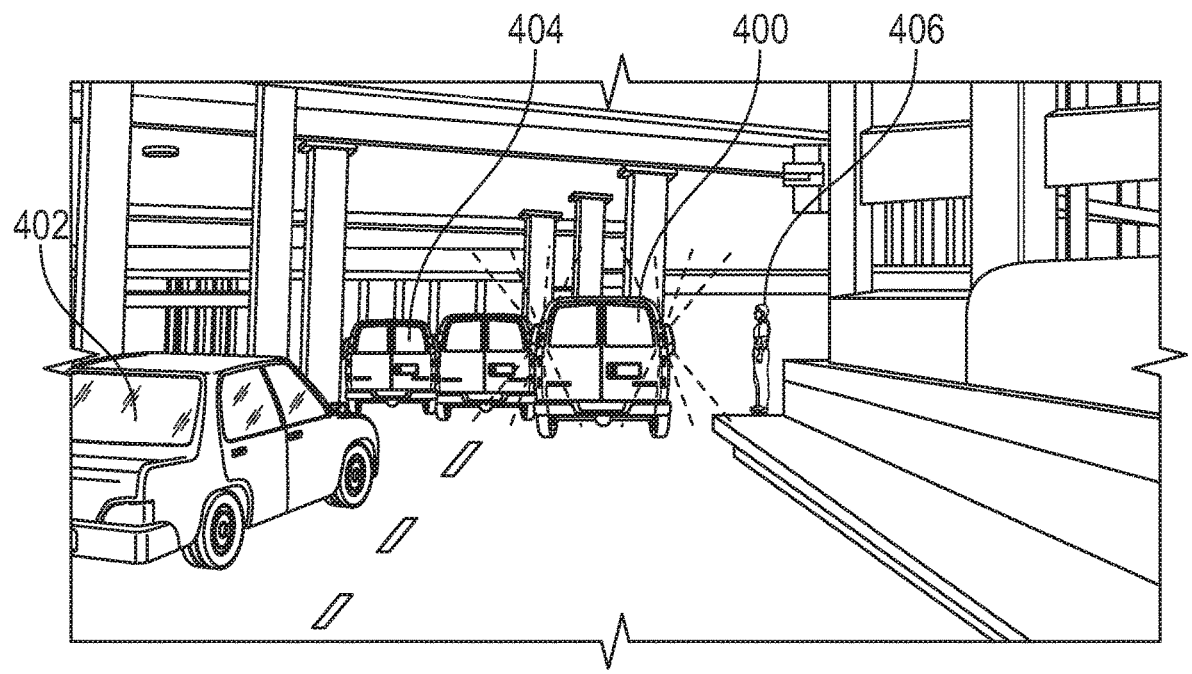
Figure 6:
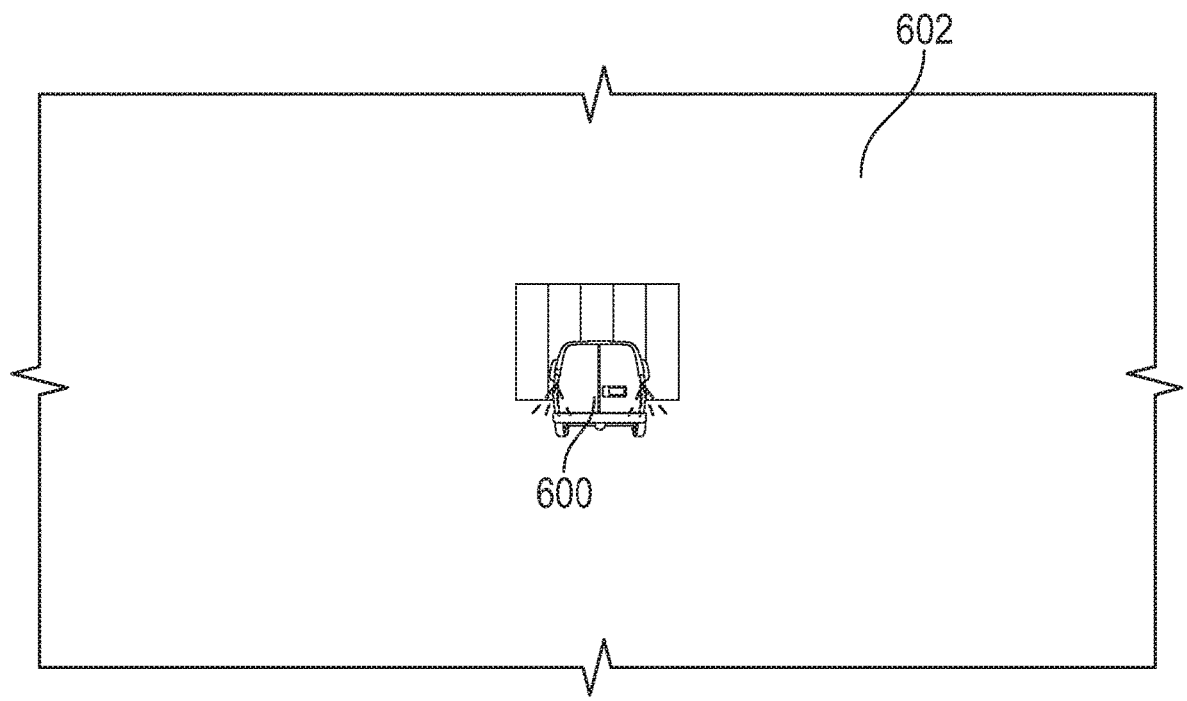
Figure 7:
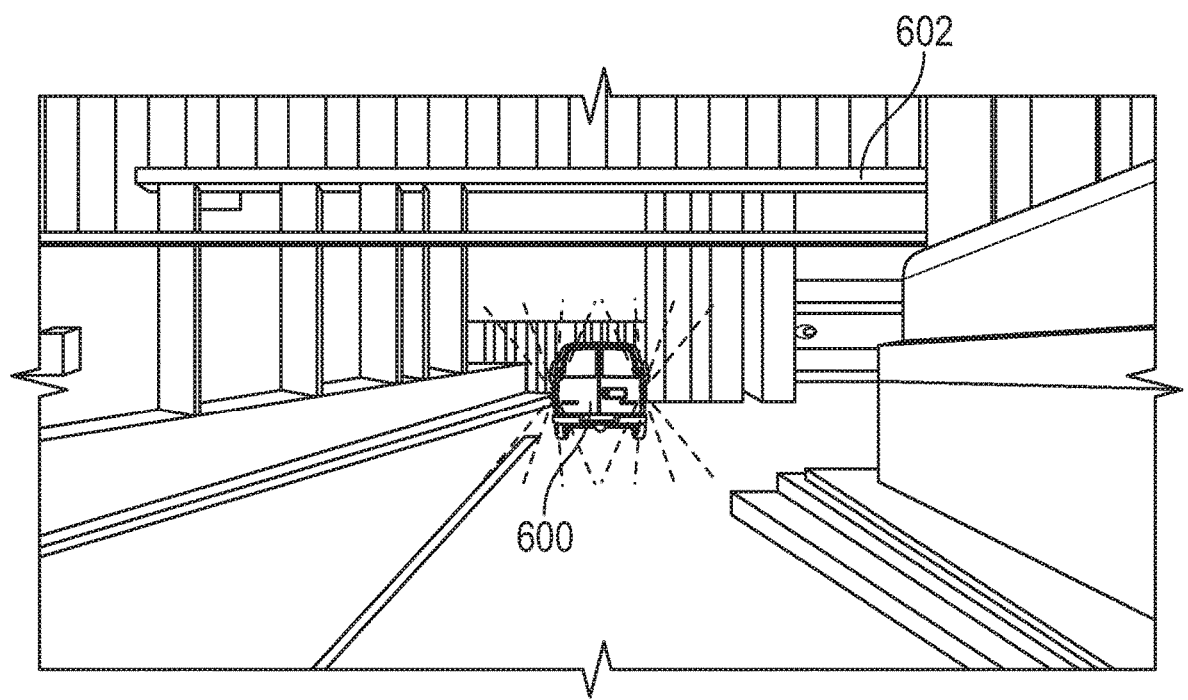

As mentioned above, the functional improvement provided by the vision sensor detection system 103 is a more rapid and a clearer image or video 109 (as seen in FIGS. 5 and 7), when compared to an image made by other available vision sensor systems from the same location (as seen in FIGS. 4 and 6). In FIGS. 4-7, the viewing perspective is that of the driver of the vehicle 100, looking forward. In FIGS. 4-5, a vehicle 400 is seen in front of the vehicle 100, in the same lane at vehicle 100. In a lane to the left of the vehicle 100, there's a vehicle 402 and a vehicle 404. At an angle to the right and in front of the vehicle 100, there's a pedestrian 406. By comparing FIG. 4 to FIG. 5, it's apparent that FIG. 5, provided by the system 103, is a much clearer image (i.e., it has better contrast and definition). In fact, the pedestrian 406 is practically undetectable in FIG. 4.

In FIGS. 6 and 7, a vehicle 600 is seen in front of the vehicle 100, in the same lane at vehicle 100. There's a notable overhead structure or support beam 602 in FIG. 7, provided by the system 103; however, support beam 602 is nearly undetectable in FIG. 6.

Figure 8:
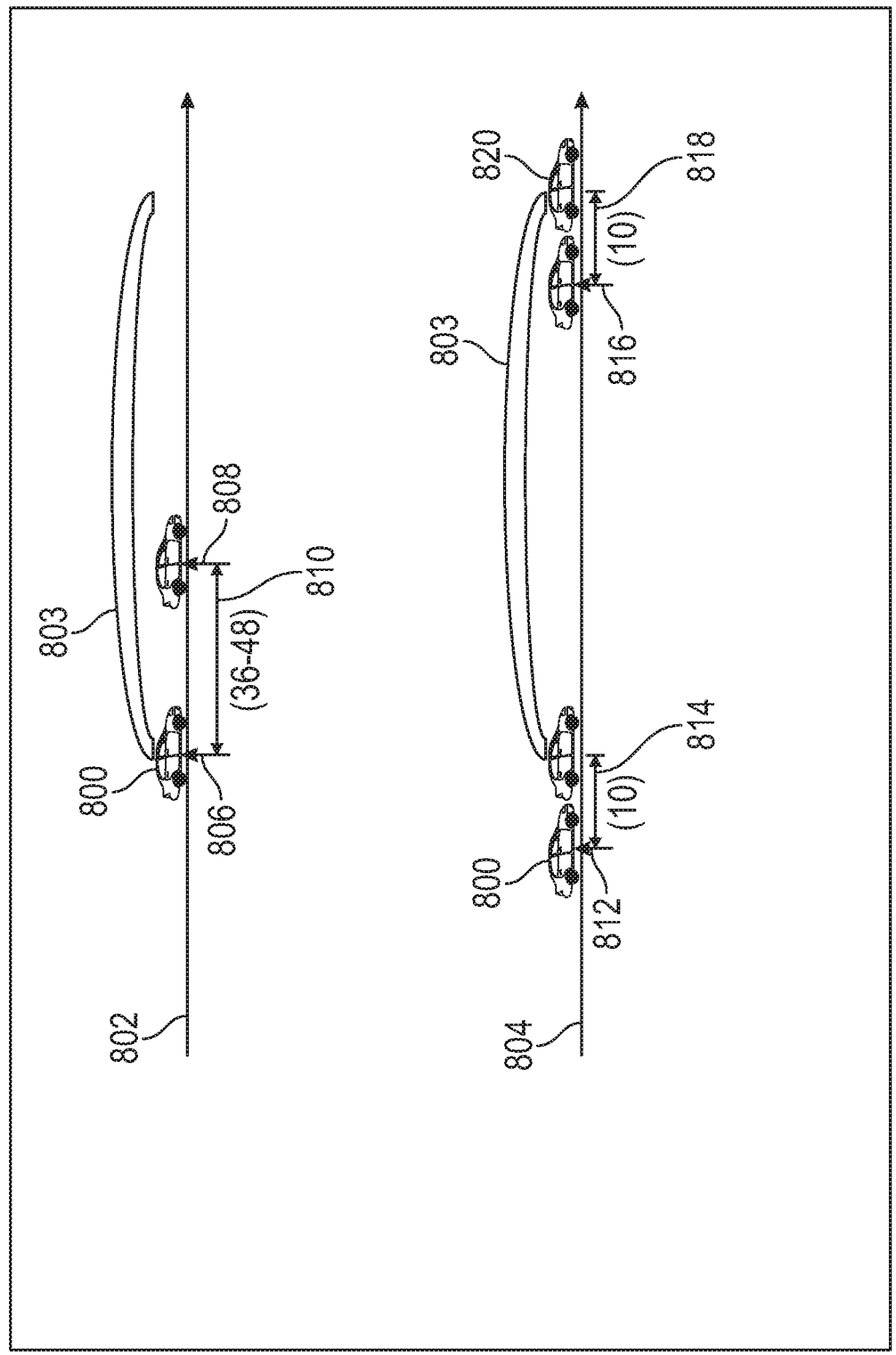
FIG. 8 is an illustration depicting functional advantages provided by the vision sensor detection system, in accordance with exemplary embodiments.

As mentioned, the provided vision sensor detection system 103 enables faster adjustments to light level transitions, referred to herein as lighting scenario (LS) changes. In FIG. 8, timeline 802 depicts a currently available vision sensor detection system, and timeline 804 depicts the provided technologically improved vision sensor detection system 103. On timeline 802, the start of tone-mapping adjustments in a camera system start (at 806) after the vehicle 800 enters the tunnel 803. At 808, the currently available vision sensor detection system completes its tone mapping adjustments to the lighting scenario of the tunnel. During the time the tone-mapping adjustments take (from when they start (806) and end (808)), the vehicle 800 has traveled a distance (denoted by arrow 810) into the tunnel; the tone-mapping can take approximately 36 to 48 frames, based on a 30 frames per second rate. This period of time, in which the camera 106 system is not adjusted to the LS, may be experienced by a viewer/user of the displayed images on the display system as a whiteout period or a blackout period.

In contrast, the provided technologically improved vision sensor detection system 103 in vehicle 801 detects the impending tunnel at 812, which is prior to entering the tunnel 803. The HD mapping and GPS data allow the processor 102 to predict the distance and or time until the LS change that is anticipated to occur due to the tunnel 803 occurs. In various embodiments, based on a 30 frames per second speed, this prediction/detection (operation 314) occurs about 10 frames prior (denoted by arrow 814) to entering the tunnel 803. Detecting and confirming the tunnel in advance of entering the tunnel is followed by followed by loading the PDP for the tunnel in advance of entering the tunnel, and by finalizing the tone-mapping adjustments for tunnel vision in advance of entering the tunnel. In a non-limiting example: 50 miles per hour equals 22.4 meters per second; an average length of a vehicle equals 4.6 meters or 15 feet; 45 frames at 30 fps equals 1.5 seconds; and at 50 mph, the time savings of 1.5 seconds (33.6 meters) would be equivalent to 7 vehicle lengths. In its entirety, as illustrated in FIG. 8, the system 103 delivers a notably improved functional result; in the example, the system 103 can save about 7 vehicle lengths of camera adjustment time at 50 miles per hour, over available systems. Further, the system 103 may eliminate the whiteout period and/or blackout period camera adjustment scenarios associated with arrow 810.

The system 103 provides this technological improvement again at the end (820) of the tunnel 803 (see, operation 326). The system 103 predicts the LS change due to the end of the tunnel at 816, about 10 frames (arrow 818) prior to the end of the tunnel 820. Detecting and confirming the end (820) of the tunnel 803 in advance, followed by loading the PDP for the lighting scenario after the tunnel enables the system 103 to finalize the tone mapping adjustments for post tunnel vision detection prior to exiting the tunnel 803.

Another functional improvement over currently available systems, as described in connection with operations 322 and 324, is that once the vehicle 801 is inside the tunnel 803, the system 103 may process camera data and sensor data to customize the tone-mapping settings so that they are tuned for a current instance inside the tunnel 803; this customizing process may repeat until the system 103 determines that the tunnel 803 is about to end.

Thus, the vision sensor detection system 103 provides a technological solution with functional improvements over conventional approaches to vision sensor detection systems for vehicles. The provided vision sensor detection systems 103 and methods proactively prepare for impending lighting scenarios.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. Various changes can be made in the function and arrangement of elements without departing from the scope of the disclosure as set forth in the appended claims and the legal equivalents thereof.

What is claimed is:

1. A vision sensor detection system for a mobile platform, comprising:
    a transceiver that receives mapping data from an external source;
    a camera system that senses light levels external to the mobile platform as a function of adjustable tone-mapping settings;
    a sensor system that generates sensor data including distances to objects;
    a geographical positioning system (GPS) that generates GPS data including location and movement of the mobile platform;
    a processor programmed with a tone-mapping program and a plurality of predefined profiles (PDPs) for an associated plurality of lighting scenarios (LSs), each PDP having a tone-mapping setting for the camera system, the processor configured to:
        receive the mapping data, GPS data, the sensor data, and the camera data;
        operate the camera system in a first lighting scenario (LS1) using an associated first PDP (PDP1);
        display camera data on a display system;
        predict a lighting scenario (LS) change as a function of GPS data and mapping data, wherein the LS change comprises a change from LS1 to a second lighting scenario (LS2);
        confirm the LS change using the camera data and the sensor data;
        retrieve a PDP2 associated with LS2; and
        operate the camera system using PDP2.

2. The system of claim 1, wherein the processor is further configured to:
    determine whether the LS2 is still current; and
    when the LS2 is still current,
    process the sensor data and the camera data to thereby customize the tone-mapping setting from PDP2; and
    operate the camera system using the customized tone-mapping setting.

3. The system of claim 2, wherein the processor is further configured to:
    when the LS2 is no longer current,
    predict an impending light scenario as a function of the mapping data, the sensor data, and the camera data;
    retrieve a PDP associated with the impending light scenario; and
    operate the camera system using the PDP associated with the impending light scenario.

4. The system of claim 3, wherein the impending light scenario is the same as LS1, and the PDP associated with the impending light scenario is PDP1.

5. The system of claim 3, wherein the impending light scenario is a third lighting scenario (LS3), and the PDP associated with the impending light scenario is PDP3.

6. The system of claim 1, wherein the LS1 is a sunny daytime, and LS2 is a tunnel.

7. The system of claim 1, wherein the LS1 is a sunny daytime, and LS2 is a commercial parking garage.

8. The system of claim 1, wherein the LS1 is a sunny daytime, and LS2 is an entrance to an airport terminal.

9. The system of claim 1, wherein the LS1 is a commercial parking garage, and LS2 is a sunny daytime.

10. The system of claim 1, wherein the LS1 is a commercial parking garage, and LS2 is nighttime.

11. A processor-implemented method for vision sensor detection for a mobile platform, comprising:
    receiving mapping data from an external source;
    receiving camera data from a camera system that senses light levels external to the mobile platform as a function of adjustable tone-mapping settings;
    receiving sensor data from a sensor system;
    receiving geographical positioning system (GPS) data including location and movement of the mobile platform from a GPS;
    determining a lighting scenario (LS1) as a function of GPS data and mapping data;
    operating the camera system in LS1 using an associated first PDP (PDP1), by referencing a plurality of predefined profiles (PDPs) for an associated plurality of lighting scenarios (LSs), each PDP having a tone-mapping setting associated with its associated LS;
    displaying the camera data on a display system;
    predicting a lighting scenario (LS) change as a function of GPS data and mapping data, wherein the LS change comprises a change from LS1 to a second lighting scenario (LS2);
    confirming the LS change using the camera data and the sensor data;
    retrieving a PDP2 associated with LS2; and
    operating the camera system using PDP2.

12. The method of claim 11, further comprising:
    determining whether the LS2 is still current; and
    when the LS2 is still current,
    processing the sensor data and the camera data to thereby customize the tone-mapping setting from PDP2; and
    operating the camera system using the customized tone-mapping setting.

13. The method of claim 12, further comprising:
    when the LS2 is no longer current,
    predicting an impending light scenario as a function of the mapping data, the sensor data, and the camera data;
    retrieving a PDP associated with the impending light scenario; and
    operating the camera system using the PDP associated with the impending light scenario.

14. The method of claim 13 wherein the impending light scenario is the same as LS1, and the PDP associated with the impending light scenario is PDP1.

15. The method of claim 13, wherein the impending light scenario is a third lighting scenario (LS3), and the PDP associated with the impending light scenario is PDP3.

16. The method of claim 11, wherein the LS1 is a sunny daytime, and LS2 is a tunnel.

17. The method of claim 11, wherein the LS1 is a sunny daytime, and LS2 is a commercial parking garage.

18. The method of claim 1, wherein the LS1 is a sunny daytime, and LS2 is an entrance to an airport terminal.

19. The method of claim 1, wherein the LS1 is a commercial parking garage, and LS2 is a sunny daytime or nighttime.

20. A vision sensor detection system for a mobile platform, comprising:
a camera system that senses light levels external to the mobile platform as a function of adjustable tone-mapping settings;
a sensor system that generates sensor data including distances to objects;
a processor programmed with a tone-mapping program and a plurality of predefined profiles (PDPs) for an associated plurality of lighting scenarios (LSs), each PDP having a tone-mapping setting for the camera system, the processor configured to:
receive mapping data, GPS data, the sensor data, and the camera data;
operate the camera system in a first lighting scenario (LS1) using tone-mapping settings from an associated first PDP (PDP1);
display camera data on a display system;
predict a lighting scenario (LS) change as a function of GPS data and mapping data, wherein the LS change comprises a change from LS1 to a second lighting scenario (LS2);
confirm the LS change using the camera data and the sensor data;
retrieve a PDP2 associated with LS2; and
operate the camera system using tone-mapping settings in the PDP2.

* * * * *